(12) United States Patent
Dombsky et al.

(10) Patent No.: US 7,682,664 B2
(45) Date of Patent: Mar. 23, 2010

(54) METHOD OF FORMING COMPOSITE CERAMIC TARGETS

(75) Inventors: Marik Dombsky, Vancouver (CA); Victoire Hanemaayer, Richmond (CA)

(73) Assignee: Advanced Applied Physics Solutions, Inc., Vancouver, B.C. (CA)

(*) Notice: Subject to any disclaimer, the term of this patent is extended or adjusted under 35 U.S.C. 154(b) by 825 days.

(21) Appl. No.: 11/147,261

(22) Filed: Jun. 8, 2005

(65) Prior Publication Data

US 2006/0040064 A1 Feb. 23, 2006

Related U.S. Application Data

(60) Provisional application No. 60/577,580, filed on Jun. 8, 2004.

(51) Int. Cl.
*B05D 3/02* (2006.01)
(52) U.S. Cl. .................. 427/372.2; 427/491; 427/376.2
(58) Field of Classification Search ............... 427/376.2
See application file for complete search history.

(56) References Cited

U.S. PATENT DOCUMENTS

| | | | |
|---|---|---|---|
| 4,010,133 A | 3/1977 | Nakayama | |
| 4,145,213 A * | 3/1979 | Oskarsson et al. | 75/238 |
| 4,160,797 A * | 7/1979 | Goppinger et al. | 264/81 |
| 4,438,557 A * | 3/1984 | Parker et al. | 250/492.22 |
| 4,491,559 A * | 1/1985 | Grab et al. | 419/36 |
| 4,525,461 A * | 6/1985 | Boecker et al. | 501/90 |
| 5,474,741 A * | 12/1995 | Mikeska et al. | 427/376.7 |
| 5,826,520 A * | 10/1998 | Mainord | 110/342 |
| 6,327,372 B1 * | 12/2001 | Devantier et al. | 381/426 |
| 6,514,894 B1 | 2/2003 | Adair et al. | |
| 6,695,984 B1 * | 2/2004 | Odaka et al. | 252/504 |
| 2003/0209534 A1 * | 11/2003 | Ferguson | 219/548 |

FOREIGN PATENT DOCUMENTS

WO WO 98/43927 10/1998

OTHER PUBLICATIONS

Rodrigo Moreno, "The Role of Slip Additives in Tape-Casting Technology, Part I-Solvents and Dispersants", Oct. 1992, Laboratory Report, American Ceramic Society, vol. 71, No. 10, 1521-1531.*
Ando et al., Wetting of aqueous solutions of organic binder (PVA) on sapphire and fused quartz, 1989, Hournal of Materials Science, 24, 4048-4051.*

(Continued)

*Primary Examiner*—Timothy H Meeks
*Assistant Examiner*—Nathan T Leong
(74) *Attorney, Agent, or Firm*—Harness, Dickey & Pierce, P.L.C.

(57) ABSTRACT

Disclosed are processes and compositions for fabricating irradiation targets from slurry compositions using a slip casting method to form a layer of the slurry composition on a substrate. The layer of slurry is allowed to dry on the substrate to produce a green cast layer that may then be cut, milled or otherwise machined to form intermediate targets having one or more predetermined configurations. These intermediate targets are subsequently subjected to a thermal process by which organic components remaining in the green cast layer are driven off and/or oxidized to form a densified, substantially inorganic, layer that has a density below that of the primary particles.

19 Claims, 4 Drawing Sheets

OTHER PUBLICATIONS

Xin Xu et al., "α—SiAlON Ceramics Obtained by Slip Casting and Pressureless Sintering", J. Am. Ceram. Soc., 86 [2], 2003, pp. 366-368.

Athen Tsetsekou et al., "Optimization of the Rheological Properties of Alumina Slurries for Ceramic Processing Applications Part I: Slip Casting", Journal of European Ceramic Society, vol. 21, Issue 3, 2001, pp. 363-373.

S.M. Olhero et al., "Particle Segregation Phenomena Occuring During the Slip Casting Process", Ceramics International, vol. 28, Issue 4, 2002, pp. 377-386.

Bern Bitterlich et al., "Rheological Characterization of Water-Based Slurries for the Tape Casting Process", Ceramics International, vol. 28, Issue 6, 2002, pp. 675-683.

R. Ramachandra Rao et al., "Effect of pH on the Dispersability of Silicon Carbide Powders in Aqueous Media", Ceramics International 25, 1999, pp. 223-230.

H. von Both et al., "Ceramic Microstructures by Electrophoretic Deposition of Collodial Suspensions".

Rodrigo Moreno, "The role of Slip Additives in Tape Casting Technology: Part II Binders and Plasticizers", Instituto de Ceramica y Vidrio, vol. 71, No. 11, 1992, pp. 1647-1657.

Zeng Yuping et al., "Tape Casting of aqueous $Al_2O_3$ slurries", Journal of European Ceramic Society 20, 2000, pp. 1691-1697.

J.M.F. Ferreira et al., "Pressure slip casting of bimodal silicon carbide powder suspensions", Ceramics International 25, 1999, pp. 491-495.

Jing-Xian Zhang et al., "Aqueous Processing of Titanium Carbide Green Sheets", J. Am. Ceram. Soc. 84 [11], 2001, pp. 2537-2541.

Mark A. Janney et al., "Attaining High Solids in Ceramic Slurries".

Michael Middlemas, "Processing of Nanocrystalline Zirconium Carbide".

Amit Mukherjee et al., "Correlation between slurry, rheology, green density and sintered density of tape cast yttria stabilized zirconia", Ceramics International 27, 2001, pp. 731-737.

* cited by examiner

METHOD OF FORMING COMPOSITE CERAMIC TARGETS

PRIORITY STATEMENT

This U.S. non-provisional application claims benefit of priority under 35 U.S.C. §119(e) from U.S. Provisional Pat. Application No. 60/577,580, filed Jun. 8, 2004, the entire contents of which are incorporated herein by reference.

BACKGROUND OF THE INVENTION

1. Field of the Invention

The invention relates to the fabrication of irradiation targets used in the production of radioactive products, particularly certain radioactive ions and radioisotopes.

2. Description of Related Art

Ceramic compositions have been used in fabricating irradiation targets that provide increased beam penetration, thereby allowing a given beam to penetrate a greater number of targets and providing a corresponding increase in the yields of the desired radioactive products, particularly radioactive ions and radioisotopes. In addition to allowing increased beam penetration, the porosity of the ceramic compositions tends to provide improved ionic effusion and diffusion rates relative to other target materials.

Slip casting, a conventional method used for manufacturing ceramic targets, is affected by many variables including the rheological properties of the slurry. For example, the properties of a particular composition will depend on the specific combination of binders, organic additives, solvents and ceramic powders used to form the composition. Similarly, the mechanical processing operations applied to the composition may affect the properties of the composition. The composition and rheological properties of the slurry, as well as the post-casting treatment, will, in turn, determine the properties of the final cast product.

For example, the viscosity of the slurry and ceramic particle size distribution are affected by the solubility of the binder and presence and composition of additives such as dispersants. The solids content of the slurry, also referred to alternatively as a slip or a suspension, is an important factor in determining the density and lateral shrinkage as detailed in A. Tsetsekou et al.'s article entitled "Optimization of the Rheological Properties of Alumina Slurries for Ceramic Processing Applications Part I: Slip Casting," *Journal of European Ceramic Society*, Vol. 21, Issue 3, March 2001, pages 363-73, the disclosure of which is hereby incorporated by reference, in its entirety. Higher densities tend to be associated with fewer and smaller pores and improved bonding between the particles which, in turn, tends to provide improved heat conduction to the surrounding material. Improved heat conduction is useful in, for example, allowing higher beam energies to be applied to the ceramic material without causing excessive localized heating or vaporization of the target material.

Large pores and/or bubbles in the green castings results in a lowered sintered density for the target product. As explained in Xin Xu et al.'s article in *J. Am. Ceram. Soc.*, 86[2] pp. 366-68, 2003, "α-SiAlON Ceramics Obtained by Slip Casting and Pressureless Sintering," the disclosure of which is hereby incorporated by reference, in its entirety, a smaller pore distribution tends to provide better reactivity between particulates. Two factors that contribute significantly to the green density of the castings are the particle size distribution and the viscosity of the slurry at the time it is cast. Controlling these factors through selection of the appropriate particle size distributions and the composition and content of the liquid portions of the slurry will generally allow the green density of the casting to be maintained within a desired range.

Improved particle dispersion tends to be associated with higher viscosities, but the higher viscosities affect the slip flow behavior and can, therefore, increase the difficulty of forming a casting having a uniform thickness. The slurry viscosity tends to increase with higher solids loading and slurries with higher solids contents also tend to be dependent on dispersant concentration. It has been found that relatively low levels of dispersant, such as between about 0.5 and 2.0 wt %, particularly compositions including about 1.0 to about 1.5 wt %, are useful in preparing high-solids slurries that exhibit an acceptable combination of properties.

Higher slurry viscosities, however, tend to increase the likelihood of trapping bubbles within the casting which will tend to increase the pore sizes in the green casting and reduce its sintered density. Another known factor that that can affect the viscosity of the slurry composition is milling. While traditional mechanical stirring tends not to affect the green density of the stirred composition, milling tends to produce sheer thinning and tends to reduce both the average particle size and the particle size distribution. These milling effects are generally attributed to the improved breakdown of larger agglomerates of the particles and particle-to-particle contact that tends to reduce the average particle size, thereby producing a composition having a higher green density.

A secondary force that plays a role in particle segregation is gravity, as discussed in S. M. Olhero and J. M. F. Ferriera, *Ceramics Int'l*, Vol. 28, Issue 4, pp. 377-86, 2002, "Particle Segregation Phenomena Occurring During the Slip Casting Process," the disclosure of which is hereby incorporated by reference, in its entirety. As the particles settle out in the cast there tends to be some segregation of the particles with the finer particles concentrated toward the upper surface and the larger particles tending to concentrate toward the middle of the layer. The lower portion of the cast layer tends to include a mixture of particle sizes.

Total solids loading and amount of fine particles present within the slurry composition will also affect particle packing. Finer particles display higher viscosities with a sheer thinning behavior. This behavior is referred to as a pseudoplastic effect and depends on both on particle orientation and flocculation. Coarser particles tend to have a lower viscosity and a sheer thickening effect. A larger particle size distribution will increase the overall green density, as the finer particles will fill in the gaps between the larger particles, thus allowing for a better packing order.

Another issue to be considered, in particular with aqueous slip casting, is the solubility of organic additives. The preferred binder compositions will be those that may be dissolved in an aqueous solution or that may be prepared as a fine aqueous emulsion or suspension. Generally, a range of polymeric emulsion binders may be used successfully to prepare slurry compositions having the desired rheological properties. The binders selected will generally have a higher viscosity, particularly for slurries that have a high solids content, and will tend to exhibit better particle suspension and dispersion within the resulting slurry.

Keeping the organic additives content low will also tend to reduce the formation of defects in the green casting. In general, castings having a higher "green" density will experience less lateral shrinkage during the subsequent sintering process. According to Bitterlich et al., specifically B. Bitterlich, C. Lutz, and A. Roosen, *Ceramics Int'l*, Vol 28, Issue 6, 2002, pp. 675-83, "Rheological Characterization of Water Based Slurries for the Tape Casting Process," the disclosure of which is hereby incorporated by reference, in its entirety, a high powder to binder ratio tends to improve green density. As used herein, "green" refers to compositions that although dry, have not been subjected to a sintering or densification process.

However, aqueous slurries tend to be dependent on pH. The pH of the slurry controls the surface charge of the particles, which in turn affects the amount of dispersion of the particles and/or the manner in which the particles flocculate within a suspension. The interaction of the particulate matter in the slurry is dependent on the pH value, type of ceramic and charge of organic additives. R. R. Rao et al., specifically R. Ramachandra Rao, H. N. Roopa, T. S. Kannan, *Ceramics Int'l* 25, 1999, pp. 223-30. "Effect of pH on the Dispersability of Silicon Carbide powders in Aqueous Media" the disclosure of which is hereby incorporated by reference, in its entirety, found that the optimum pH for dispersing SiC particles in deionized water to be basic with a target pH of about 10. Rao et al. also noted that the SiC particles tended to flocculate substantially under a more acidic pH and tended to agglomerate at pH levels above about 10. A suspension or slip that has a high solids loading and an appropriate pH will generally produce castings having improved green density and packing uniformity than compositions having lower loadings and/or less desirably pH values.

Provided that the pH is maintained at a somewhat basic level, the particles will typically tend to stay suspended longer in solution whereas under acidic conditions the rate of particle deposition or segregation tends to increase considerably. It also seems that the amount of dispersing agent directly affects how well the particulates stay suspended in solution. See Ceramic Microstructures by Electrophoretic Deposition of Colloidal Suspensions, H. von Both, J. Haußelt, *Proceedings of International Conference on Electrophoretic Deposition: Fundamentals and Applications*, Aug. 18-22, 2002, *J. of Electrochemical Society*, the contents of which are incorporated herein, by reference, in their entirety. Although the casting green density tends to be relatively independent of the dispersing agent content, excessive amounts of dispersing agent will tend to slow the manufacturing operation because the particles will tend to remain suspended for a longer period of time and insufficient amounts of dispersing agent will tend to reduce the uniformity of the casting because the particles will tend to fall out of suspension too quickly.

BRIEF SUMMARY OF THE INVENTION

The exemplary embodiments of the present invention provide a method for fabricating targets having a composite ceramic/substrate structure, for example a metal carbide layer formed on a graphite foil, by slip casting a ceramic layer on a substrate material such as a sheet of flexible exfoliated graphite or a glass sheet. Slip casting is a technique whereby ceramic bodies may be fabricated from a liquid slurry or "slip" typically including one or more powdered ceramic compositions mixed with a solvent and a minor portion of one or more additives selected from, for example, binders, plasticizers, dispersants and surfactants. After the liquid slip has been cast, the solvent is evaporated to form an intermediate body having a green cast layer. The intermediate body may optionally be machined, milled, cut or otherwise formed into one or more standard sized elements. The intermediate body is then heated or "fired" at one or more elevated temperatures to remove or "burn off" the remaining organic components including, for example, any organic additives, under conditions sufficient to sinter and densify the ceramic composition and thereby produce a hard, densified ceramic body. Alternatively, the green cast layer may be separated from the substrate before forming the densified ceramic material layer.

BRIEF DESCRIPTION OF THE DRAWINGS

The example embodiments of the invention will be readily understood with reference to the following detailed description thereof provided in conjunction with the accompanying drawings, wherein like reference numerals designate like structural elements.

These drawings are provided for illustrative purposes only and are not drawn to scale. The spatial relationships and relative sizing of the elements illustrated in the various embodiments may have been reduced, expanded or rearranged to improve the clarity of the figure with respect to the corresponding description. The figures, therefore, should not be interpreted as accurately reflecting the relative sizing or positioning of the corresponding structural elements that could be encompassed by an actual device manufactured according to the example embodiments of the invention.

DETAILED DESCRIPTION OF EXAMPLES

The slip cast ceramic material will typically be sintered before being used as a target in order to remove substantially all of the organic content, e.g., binders, dispersants, viscosity modifiers, etc., present in the composition as cast. As discussed in more detail below, a plurality of target elements may be sintered simultaneously in a generally enclosed holder, such as a metal tube and, in particular, a tantalum tube. In such a sintering operation, it is preferable that the lateral shrinkage of the green castings be relatively minor or that the combination of the casting and the holder be configured so that sufficient thermal contact may be maintained between the castings and the holder. Increasing the contact surface area between the green castings and the holder increase the conductive heat transfer. Because the refractory compositions produced by sintering the green castings tend to be refractory carbides having relatively low thermal conductivity, a layer of carbon foil or other conductor may be incorporated improve the heat conduction.

The fabrication of the ceramic bodies according to the present invention will typically include the steps of:

a. preparing an initial slurry including one or more ceramic powders, the powders typically having a range or several ranges of average particles sizes between about 1 and about 10 μm, with a solvent (or continuous liquid phase), and commonly one or more compounds having dispersant and/or surfactant properties;

b. milling or mixing the slurry to mix the components thoroughly and to obtain an intermediate slurry (Stage 1);

c. incorporating one or more plasticizer(s), binder(s), dispersant(s), viscosity modifier(s) and/or additional surfactant(s) into the intermediate slurry followed by additional milling or mixing to produce a final slurry having the desired Theological properties (Stage 2);

d. applying the final slurry to a premanufactured substrate, such as a 0.13 mm thick flexible sheet of exfoliated graphite foil or a glass plate. (Such graphite foils are commercially available under the trade names of Grafoile®, Sigraflex® and Papyex®);

e. evaporating the majority of the solvent from the final slurry to produce a green layer of the ceramic composition on the substrate and cutting or shaping the green layer, and, optionally, the substrate, to prepare green preforms having a generally uniform shape or complementary shapes; and f. heating the preforms to a temperature and for a time sufficient to remove substantially all of the remaining organic component of the green layer and to sinter and densify the ceramic(s) to produce a target or target elements having a sintered and densified ceramic, such as a metal carbide layer formed on a substrate layer, such as a graphite foil.

Although the ratio of the final thickness of the sintered ceramic layer to the thickness of the substrate layer may be adjusted as necessary based on the intended application, the dimensions of the preforms and the materials used, it has been found that a ratio of between about 2:1 and 1:2 will generally produce a satisfactory result. However, because the ceramic layer thickness will tend to decrease during the drying and sintering/densifying processes, the thickness of the initial slurry layer should be adjusted to provide a greater initial ratio with respect to the substrate layer to achieve a final thickness ratio within the desired range.

Additional steps may be utilized for fabricating a target including a plurality of individual target elements including:

a. additional cutting or shaping the preforms to obtain a plurality of preforms that are similar or complementary and/or are adapted for use with a particular holder or tube;

b. stacking or otherwise arranging the preforms within a target casing, tube, shell or other container to form a target preform; and c. heating the target preform in a first temperature range to remove substantially all of the remaining organic component of the green layers and heating the target preform in a second higher temperature range to sinter and densify the ceramic material layer(s) to produce a target assembly including a plurality of target elements having a sintered and densified ceramic layer arranged on a substrate layer.

EXAMPLE 1

SiC

Stage 1 Slurry Components:

| 23.81 g | SiC | (42.57%) | Ceramic Powder |
|---|---|---|---|
| 11.27 g | H$_2$O | (20.15%) | Solvent |
| 0.751 g | NH$_3$CO$_3$ | (1.34%) | Dispersant |
| 1.53 g | 1-Butanol | (2.74%) | Surfactant |

Stage 2 Slurry Components:

| 0.657 g | PEG 400 | (1.17%) | Plasticizer |
|---|---|---|---|
| 0.845 g | Glycerol | (1.51%) | Plasticizer |
| 15.96 g | 5% PVA solution | (28.54%) | Binder in solvent |
| 1.11 g | Methanol | (1.98%) | Surfactant |
| 55.93 g | total | (100%) | |

*Butanol/Methanol 60/40

Slurry Formation (Stage 1)

A 50/50 mixture of 1 micron and 7 micron SiC powder was prepared and placed in a ceramic jar. Then 0.751 g of NH$_3$CO$_3$ was dissolved in 11.27 g of deionized water to form a solution. The resulting solution was then added to the ceramic jar along with 2 ceramic beads, and the contents were briefly mixed to form an initial slurry. The 1-Butanol was then added to the slurry, the jar was sealed and allowed to mill for one hour to form an intermediate slurry.

Slurry Formation (Stage 2)

The plasticizers and binder were then added to the intermediate slurry, followed by the 1.11 g of methanol and a third ceramic bead. The jar was once again sealed and the contents milled for 4 hours to prepare the final slurry composition (slip).

Slip Casting

The resulting slurry (slip) was then poured over 0.13 mm thick graphite foil, and allowed to dry overnight to form a preform having a green metal carbide layer on the graphite foil substrate.

Target Production and Testing

Figure 1A:
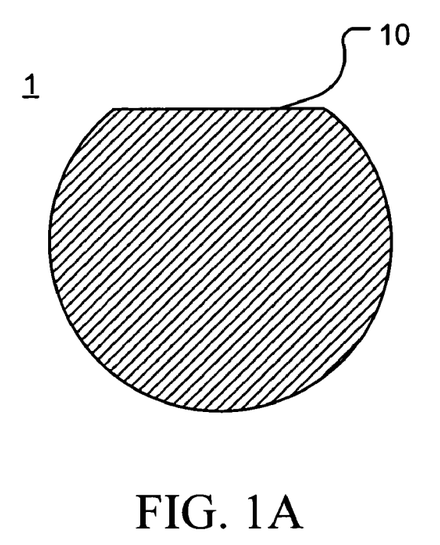
FIGS. 1A-1D illustrate plan views of target configurations suitable for use in the present invention.

Target preforms were produced by forming a series of round discs 1 (about 18 mm), with an edge portion 10 removed as illustrated in FIG. 1A. These discs were subsequently weighed and measured for thickness. Density values were calculated with the obtained mass and thickness values. A small dab of the binder solution was applied to the graphite side of the discs and used to form a disc pile or stack by securing five of the discs to one another after aligning the "flat" regions that were formed by removing edge portions of the individual discs. This disc pile was then placed in a tantalum tube having an inner diameter corresponding to the diameter of the discs with the "flat" regions oriented toward the upper portion of the tube. The preparation of disc piles and the insertion of additional disc piles and/or individual discs may be continued until the desired cumulative thickness is obtained or the tube is filled.

Once the desired number of discs have been inserted in the tube, the open end (or ends) of the tube may be capped with tantalum foil or other compatible material and placed in a vacuum chamber. In an exemplary embodiment, the discs may then be heated by passing electrical current directly through the tube and thereby utilize the tube as a resistance heater element. The discs, as a result of their contact with and proximity to the hot tube walls will be heated primarily by conductive and radiant heat transfer.

Although a tantalum tube has been used successfully and provides a satisfactory combination of cost, manufacturability and working temperature range, other materials could also be used in manufacturing the preform holder. Other materials that would likely be acceptable include graphite, which is relatively inexpensive, metal carbides, or refractory metals such as molybdenum, tungsten or rhenium, which tend to be relatively more expensive.

In one exemplary embodiment, an increasing level of electrical current was applied to a tantalum tube to gradually heat the enclosed discs. In one particular embodiment, the applied current was increased at a rate of about 0.1 A/minute to a maximum of about 200 A, thereby causing the majority of the organic components remaining the in green layer to evaporate and/or "burn off." Once the majority of the organic components had been removed from the discs, the temperature of the tube and the discs was increased to a level sufficient to cause sintering of the remaining inorganic components present in the dried slip. In one particular embodiment, the applied current was increased further at a rate of about 0.4 A/minute to a maximum of about 450 A.

Although exfoliated graphite substrates have been used for each of the Examples and has provided acceptable results, other substrates could also be used. In selecting a substrate for use with the generation of radioisotopes, it is preferred that the substrate be relatively transparent to the applied beam, i.e., exhibits low absorption levels, to ensure that the majority of the beam is applied to the metal carbide layer for the production of the desired radioisotopes. Carbon, particularly in the form of exfoliated graphite, provides a satisfactory combination of beam transmission, due to its relatively low atomic number, strength, durability and thermal conduction. Good thermal conductivity is useful both during the post-casting treatment of the green layer formed on the substrate and for promoting power dissipation as the beam is applied to the completed target. Improved power dissipation assists in getting the applied beam energy out of the target to avoid overheating and/or allow the use of higher beam currents for increased productivity. Graphite substrates may also be used with other ceramics such as nitrides, borides or silicides, but would generally not be suitable for use with oxides due to the potential for oxidation into CO and $CO_2$ during the thermal treatments and the resulting degradation of both the substrate and the ceramic layer.

In general, therefore, the substrate material selected should be compatible with the applied ceramic material(s), should provide sufficient mechanical strength and durability, and have satisfactory thermal conductivity. For example, some ceramic compositions could be cast on and supported by thin refractory metal foils. However, the beam power dissipation increases in materials having higher atomic numbers, so metal foils of sufficient strength and conductivity will tend to exhibit an undesirable level of absorption and reduce the portion of the beam energy available for producing the desired radioisotope products.

EXAMPLE 2

TiC

Stage 1 Slurry Components:

| 94.00 g | TiC | (48.43%) | Ceramic Powder |
|---|---|---|---|
| 30.00 g | $H_2O$ | (15.46%) | Solvent |
| 2.19 g | $NH_3CO_2$ | (1.13%) | Dispersant |

Stage 2 Slurry Components:

| 2.85 g | PVA | (1.47%) | Binder |
|---|---|---|---|
| 54.15 g | $H_2O$ | (27.90%) | Solvent |
| 2.26 g | PEG 400 | (1.16%) | Plasticizer |
| 3.78 g | Glycerol | (1.95%) | Plasticizer |
| 4.86 g | 1-Butanol | (2.50%) | Surfactant |

Slurry Preparation (Stage 1)

A 50/50 mixture of 1 micron and 7 micron TiC powder was prepared and placed in a ceramic jar. Then 2.19 g of $NH_3CO_3$ was dissolved in 30.00 g of deionized water to form a solution. The resulting solution was then added to the ceramic jar along with 2 ceramic beads, and the contents were briefly mixed to form a slurry and allowed to mill for two hours to form an intermediate slurry.

Slurry Formation (Stage 2)

The plasticizers and binder were then added to the intermediate slurry, followed by the 4.86 g of 1-butanol and a third ceramic bead. The jar was once again sealed and the contents milled for four hours to prepare the final slurry composition (slip).

Slip Casting

The resulting slurry (slip) was then poured over 0.13 mm thick graphite foil, and allowed to dry overnight.

Target Production and Testing

Targets were produced by preparing round discs (approximately 18 mm in diameter) with a "flat" region as illustrated in FIG. 1 A. These discs were subsequently weighed and measured for thickness. Density values were calculated with the obtained mass and thickness values. A small dab of the binder solution was applied to the graphite side of the discs and used to form a disc pile or stack by securing five of the discs to one another after aligning the "flat" regions previously formed by removing edge portions from the individual discs. This disc pile was then placed in a tantalum tube having an inner diameter generally corresponding to the diameter of the discs with the "flat" regions oriented toward the upper portion of the tube. The preparation of disc piles and the insertion of additional disc piles and/or individual discs may be continued until the desired cumulative thickness is obtained or the tube is filled.

In one exemplary embodiment, an increasing level of electrical current was applied to a tantalum tube to gradually heat the enclosed discs. In one particular embodiment, the applied current was increased at a rate of about 0.1 A/minute to a maximum of about 200 A, thereby causing the majority of the organic components remaining the in green layer to evaporate and/or "burn off." Once the majority of the organic components had been removed from the discs, the temperature of the tube and the discs was increased to a level sufficient to cause sintering of the remaining inorganic components present in the dried slip. In one particular embodiment, the applied current was increased further at a rate of about 0.4 A/minute to a maximum of about 450 A.

As reflected above, the cast TiC layers and the target discs incorporating them were produced using substantially the same aqueous slip casting techniques as was used with the SiC example. In general, the casting of water-based slurries can be difficult to control, further, because the quantity of powdered ceramic was adjusted to obtain a slurry having Theological properties generally consistent with those of the slurry produced in the first example, the TiC was present at different molar concentration than the SiC as used in the first slurry composition. In general, the slip viscosity is a significant factor in the evenness of the resulting cast layer relatively thick, but still flowable, slurries tending to produce more even casts than those that are thinner.

EXAMPLE 3

ZrC

Stage 1 Slurry Components:

| 39.36 g | ZrC powder (−325 mesh) | (71.15%) | Powdered Ceramic |
|---|---|---|---|
| 0.79 g | Paraffin oil | (1.43%) | Dispersant |
| 12.20 g | MEK/Ethanol (60/40) | (22.05%) | Solvent |

Stage 2 Slurry Components:

| | | | |
|---|---|---|---|
| 1.23 g | PEG 400 | (2.22%) | Plasticizer |
| 1.74 g | PVB (Avg. MW 35,000) | (3.15%) | Binder |
| 55.32 g | total | | |

Slurry Preparation (Stage 1)

A 250 ml alumina milling jar was filled with an aliquot of zirconium carbide powder, paraffin oil and the MEK/Ethanol solvent mixture. After adding six small alumina ceramic beads, which assist in the grinding and dispersing action of the wet powder, the milling jar was capped and milled for one and a half hours to produce an intermediate slurry.

Slurry Formation (Stage 2)

The PEG 400 and PVB were then added to the intermediate slurry, after which the slurry composition was milled for an additional two and half hours to produce a final slurry.

Although, in each of the Examples the milling or mixing time is reduced to decrease the chance of or concentration of contaminants from the milling jar could be incorporated into the slurry, under normal operating conditions it is anticipated that the slurry compositions could be milled for a period of up to about 48 hours or more without experiencing significant problems, particularly if the milling jar is constructed from or lined with a compatible material or materials.

Slip Casting

The resulting slurry (slip) was then poured over 0.13 mm thick graphite foil, and allowed to dry. With this particular composition, the majority of the solvent within the final slurry composition evaporates at a rate sufficient to form a green cast layer in which the particle distribution generally reflects the distribution within the cast slurry and does not exhibit an undesirable degree of settling and non-uniformity.

EXAMPLE 4

ZrC

Another embodiment utilizes trichloroethylene as the primary solvent for slip casting a ZrC slurry onto graphite foil. Trichloroethylene was found to provide improved particle suspension that tended to exhibit less flocculation. Further, the use of two plasticizers, rather than only a single plasticizer, tended to improve the flexibility of dried green casts prepared from the resulting slurry. The sintered layers of this exemplary slurry composition produced products were relatively free of surface crack and exhibited a sufficient hardness.

It has also been determined that pre-treating the carbide powder that will subsequently be used to form the refractory carbide slip casting tends to improve the actual slip casting process. It has also been observed that the particle shape of the carbide powder tends to affect the drying behavior of the resulting green cast layers. In particular, it appears that if other conditions are relatively constant, flatter particle configurations tend to result in improved particle packing and, consequently, higher layer densities. The particle size and shape can be modified to some degree by using a plenary ball milling system at high speeds or other milling system that will tend to reduce the average particle size, ideally while introducing relatively few contaminant particles.

In this example, the initial ZrC particles were processed in a tungsten carbide-lined milling jar using milling balls made of the same material, tungsten carbide, and thereby reduce the potential sources of particles other than the primary ZrC and generate less contamination as the ZrC particles are processed in the mill.

Using trichloroehthylene as the solvent/continuous phase for forming the slurries tended to produce dried green casts that exhibited less powder flocculation during the drying process. It was also noted that using two plasticizers together in combination tended to produce dried green casts that exhibited marked improved flexibility. One such combination of plasticizers that provided improved green cast flexibility was polyethylene glycol 400 (PEG 400) with benzylbutyl phthalate.

Pre-Treatment of ZrC Powder:

| | |
|---|---|
| 80 g | ZrC powder (325 mesh = 10 microns or less) |
| 8 | tungsten carbide (WC) balls |
| 250 ml | WC milling jar |

Powder was ground at 400 rpm for 5 minutes with a 30 minute cool down. This was repeated twice for a total of 15 minutes of dry grinding time.

Stage 1 Slurry Components:

| | | | |
|---|---|---|---|
| 25.0 g | ZrC powder (pre-treated) | (59.1%) | (ceramic powder) |
| 9.0 g | TCE (Trichloroethylene) | (21.3%) | (solvent) |
| 0.6 g | Paraffin Oil | (1.4%) | (dispersant) |

The mixture was then milled in a 250 ml. WC milling jar with eight WC balls for three hours at 80 rpm in a plenary ball mill system.

Stage 2 Slurry Components:

| | | | |
|---|---|---|---|
| 0.70 g | PEG 400 (polyethylene glycol) | (1.7%) | (plasticizer) |
| 0.70 g | BBP (benzyl butylphthalate) | (1.7%) | (plasticizer) |
| 5.0 g | TCE (trichloroethylene) | (11.8%) | (solvent) |
| 1.3 g | PVB (polyvinyl butyral) | (3.1%) | (binder) |

PEG 400 and BBP were dissolved in trichloroethylene and then added to the ZrC slurry prepared in stage 1. These initial plasticizers were mixed gently into the slurry composition for a moment before adding the binder (PVB). Milling was then reinitiated and continued for another three hours at 60 rpm to obtain the final slurry.

Graphite foil (0.13 mm thick) was laid out over a glass plate that was treated with a release composition, for example a lubricant such as WD-400. The ZrC slurry composition was then poured over the foil and allowed to dry over night to obtain a dried green cast layer. 18 mm diameter composite plugs were then removed from the resulting dried green cast layers and graphite foil substrate using a hollow punch. The average thickness and mass of these plugs were then measured so that the ceramic layer density could be calculated.

The average green density obtained was 3.34 g/cm³, with an average thickness of 0.36 mm, a value that is about 51% of the literature value for ZrC (6.56 g/cm³).

Further tests were done to examine properties the final sintered product obtained by heating the green cast layer under conditions sufficient to evaporate and/or burnoff the organic components of the green cast layer. A tantalum boat was made to fit in the evaporator, so an inert environment could be maintained during heating of the composite discs, and the discs could be easily retrieved after completion of the sintering process. There were three different sets of composite discs loaded into the boat. One set was made with an aqueous based cast similar to the SiC/C composite discs discussed above while the second and third sets of discs were prepared from TCE-based slurries. It was noted, however, that even slight variations in the casting procedure could produce noticeable changes in the appearance of the dried cast, particularly with respect to the apparent granularity of the surface, apparently resulting from varying degrees of flocculation during the drying process.

The ZrC/C discs were then heated as detailed above to a temperature of approximately 1900° C. After the organic burnout/sintering process was completed, the finished discs were analyzed for cracking and lateral shrinkage. There was practically no lateral shrinkage detected in any of the discs. The discs with the more granular appearance tended to be more brittle, as the grain-like boundaries between the agglomerations of ceramic particles in the flocculated layer tended to result in cracking or weakened regions between adjacent ceramic agglomerations. Other discs, that exhibited little or no initial flocculation problems, tended to sinter very well and produce densified layers that were smooth and hard and had no cracks that were visible to the eye. The densities of these layers, however, were only slightly higher than their corresponding green densities.

The amount of particle flocculation that occurs as the refractory slip composition is dried to obtain the green cast layers appears to contribute to the quality and uniformity of the refractory layer in the final sintered product. Observations made during the course of preparing the Examples discussed herein suggest that flocculation occurs when the organic polymers separate to some degree from the refractory particle component of the slurry and form grain like boundary areas.

Thus, during organic binder burnout, the organic materials that appear to form these grain boundaries are burned off and leave a variety of empty zones or fine voids on the surface of the sintered slurry. These voids will tend to remain throughout the entire sintering process and, at least under the general sintering conditions, the grains separated by these voids will not tend to grow into or otherwise form larger and stronger particles and thereby produce a strong ceramic material. Accordingly, the formation and composition of the green cast layer tends to directly affect the quality and appearance of the resulting final product.

EXAMPLE 5

$CaZrO_3$

Stage 1 Slurry Components:

| 24.0 g | $CaZrO_3$ | (48.3%) | Powdered Ceramic |
|---|---|---|---|
| 7.8 g | $H_2O$ | (7.8%) | Solvent |
| 0.72 g | $NH_3CO_3$ | (0.72%) | Dispersant |

The mixture was then milled in a 250 ml tungsten carbide (WC) milling jar containing 6 WC balls for 3 hours at 60 rpm in a plenary ball mill system.

Stage 2 Slurry Components

| 0.72 g | PEG 400 | (1.4%) | Plasticizer |
|---|---|---|---|
| 0.90 g | Glycerol | (1.8%) | Plasticizer |
| 15.6 g | 5% PVA solution | (15.6%) | Binder |

A surfactant mixture of 1.8 ml 1-butanol and 1.2 ml of methanol was added to the calcium zirconate suspension in order to reduce the number of bubbles present. Then two more WC balls were added for more effective mixing. The mixture was then milled for a further two hours at 60 rpm.

After mixing the $CaZrO_3$ suspension was poured onto a glass surface that was well coated with a release composition, for example a lubricant such as WD-40®, and then allowed to air dry. A hollow punch was used to separate discs with a 0.625 inch (about 1.6 cm) diameter from the dried layer. These discs were then measured for mass and thickness to allow their green densities to be calculated. The average thickness of the discs was 0.44 mm and the average density was determined to be 1.91 g/cm³.

Binder burnout and sintering took place in a furnace under an air atmosphere at ambient pressure. The presence of oxygen in the burnout atmosphere is believed to assist in complete burnout of the organic components through formation and outgassing of CO and/or $CO_2$. The discs were placed flat on a ceramic plate in the furnace and heated according to the following program.

Binder burnout and Sintering program:

Stage (1): ramp from ambient at 0.5° C./min to 650° C.
Stage (2): ramp from 650° C. at 2.0° C./min to 1200° C.
Stage (3): hold for 75 min. at 1200° C.
Stage (4): cool to ambient The ceramic disc formed using the combination of the slurry detailed above and the recited burnout and sintering program were found to be smooth and generally free of surface cracking. There was some lateral shrinkage (resulting a diameter reduction of about 0.3 mm) while the layer the thickness remained relatively constant.

Initially the ceramic green calcium zirconate discs were sintered in the evaporator under vacuum and with resistive heating. However, it was observed the discs retained a greyish colour which indicated that burnout (or burnoff) of the organic components was incomplete. By sintering the green discs under an atmosphere including oxygen, the organic burnout was completed more easily to produce discs having ceramic layers that are a white or slightly off-white color. It appears, therefore, that an oxygen rich environment has proven to be more efficient during binder burnout.

Target Production and Testing

Targets were produced by preparing round discs (approximately 18 mm in diameter) with a "flat" region as illustrated in FIG. 1A. These discs were subsequently weighed and measured for thickness. Density values were calculated from the mass and thickness values obtained from the discs. A small dab of the binder solution was applied to the graphite side of the discs and used to form a disc pile or stack by securing five of the discs to one another after aligning the "flat" regions that were formed by removing edge portions of the individual discs. This disc pile was then placed in a tantalum tube having an inner diameter corresponding to the diameter of the discs with the "flat" regions oriented toward the upper portion of the tube. The preparation of disc piles and the insertion of additional disc piles and/or individual discs may be continued until the desired cumulative thickness is obtained or the tube is filled.

In one exemplary embodiment, an increasing level of electrical current was applied to a tantalum tube to gradually heat the enclosed discs. In one particular embodiment, the applied current was increased at a rate of about 0.1 A/minute to a maximum of about 200 A, thereby causing the majority of the organic components remaining the in green layer to evaporate and/or "burn off." Once the majority of the organic components had been removed from the discs, the temperature of the tube and the discs was increased to a level sufficient to cause sintering of the remaining inorganic components present in the dried slip. In one particular embodiment, the applied current was increased further at a rate of about 0.4 A/minute to a maximum of about 450 A.

As will be appreciated, the diameter and length of the target tube or shell and the diameter of the discs or other target elements can be varied as desired depending on the materials used and the intended application. As discussed above, a tantalum tube having and inner diameter of about 18 mm and a length of about 20 cm has provided satisfactory performance.

As illustrated in FIGS. 1A-D, a number of disc profiles can be used in combination with a tube. As illustrated in FIG. 1A, an edge portion 10 of the disc 1 may be removed to form a "flat" that can, in turn, be used for aligning the discs and, in cooperation with an alignment structure provided in the tube, can help maintain the alignment of the discs within the tube during processing. Further, the void created between the "flat" and the inner wall of the tube forms a channel for the gas flow resulting from the outgassing and/or burn-off of the organic components as the green cast layers are heated to their sintering temperature and/or for collection of gases emitted during the irradiation of the final target.

Figure 1B:
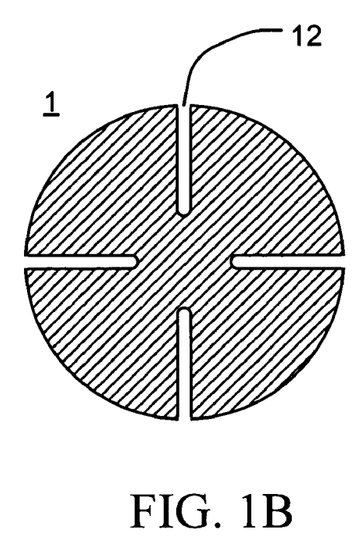
Figure 1C:
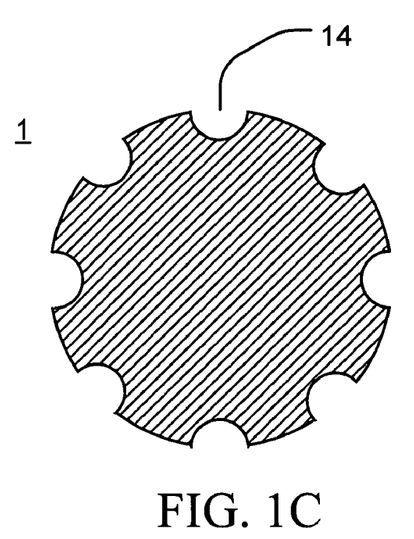
Figure 1D:
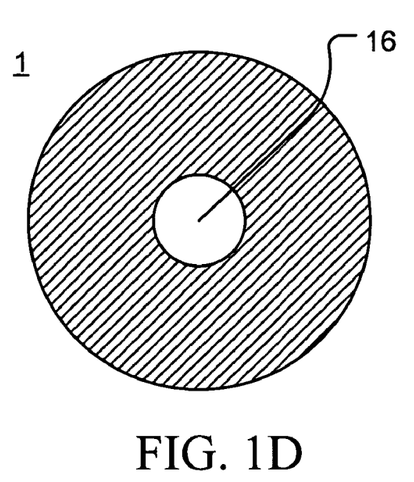

As illustrated in FIG. 1B, the disc 1 may be provided with a plurality of slots 12 that can be used to form gas channels or passages, cooperate with alignment structures to maintain the disc orientation and/or to relieve stress within the disc. As illustrated in FIG. 1C, the disc 1 may be provided with a series of notches 14 arranged along the circumference of the disc. These notches 14 can be used to form gas channels or passages and/or cooperate with alignment structures to maintain the disc orientation. As illustrated in FIG. 1D, the disc 1 may be provided with one or more holes 16 that can be used to form gas channels or passages and/or cooperate with alignment structures to maintain the disc orientation. Those of ordinary skill will appreciate that these configurations are only exemplary and that the discs, which may not have a generally circular perimeter, may be manufactured in a wide range of sizes and profiles to adapt the final product for its intended use.

Figure 2A:
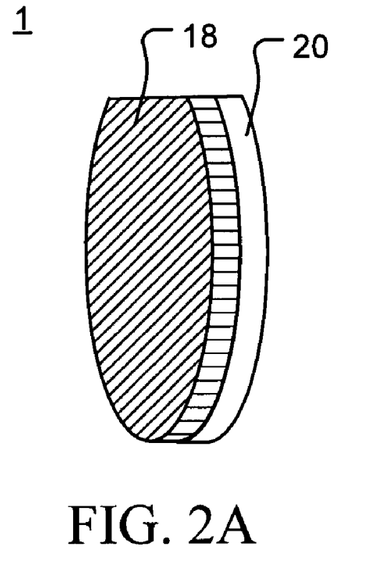
FIGS. 2A-2C illustrate target configurations according to the invention in both single and multiple configurations.
Figure 2B:
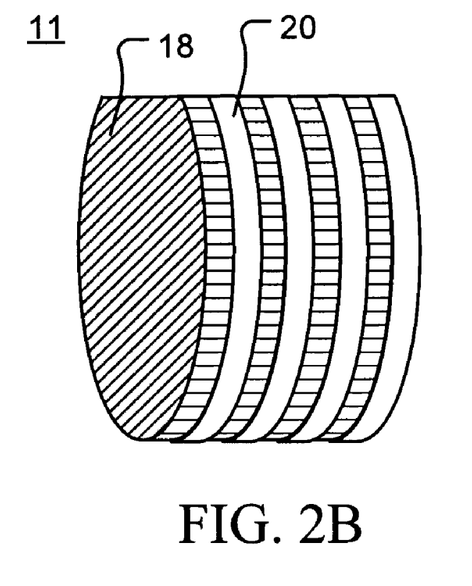
Figure 2C:
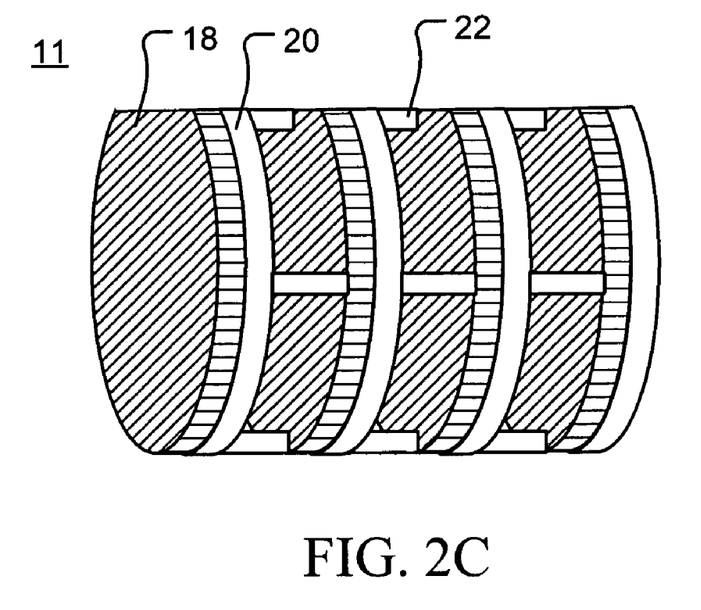

As illustrated in FIG. 2A, each disc 1 will include a cast layer 18 supported on a substrate layer 20. As with the disc configurations illustrated in FIGS. 1A-D, the substrate may be provided with additional grooves or channels on its back surface to reduce the mass, increase the flexibility and/or provide channels for gas flow (not shown). As described above and illustrated in FIG. 2B, a plurality of discs 1 can be assembled into a stack or pile 11 to improve handling. As illustrated in FIG. 2B, the stack 11 may include only discs 1 and an adhesive (not shown) or, as illustrated in FIG. 2C, the discs may be alternated with spacer structures that may be solid (not shown) or open to improve the outgassing from the surface of the cast layers 18 and/or modify the properties of the resulting target structure as desired.

Figure 3A:
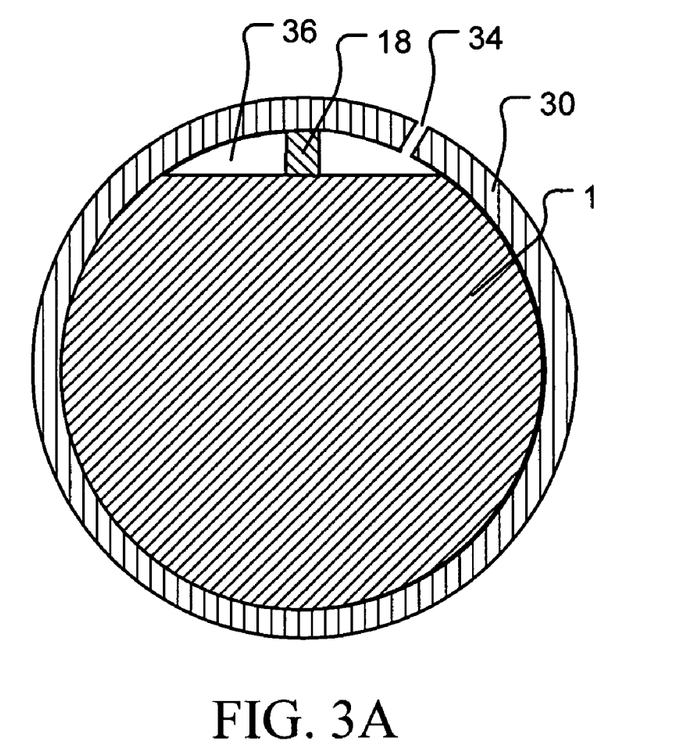
FIGS. 3A and 3B illustrate a cross-sectional and a perspective view of targets according to the invention arranged in a holder.
Figure 3B:
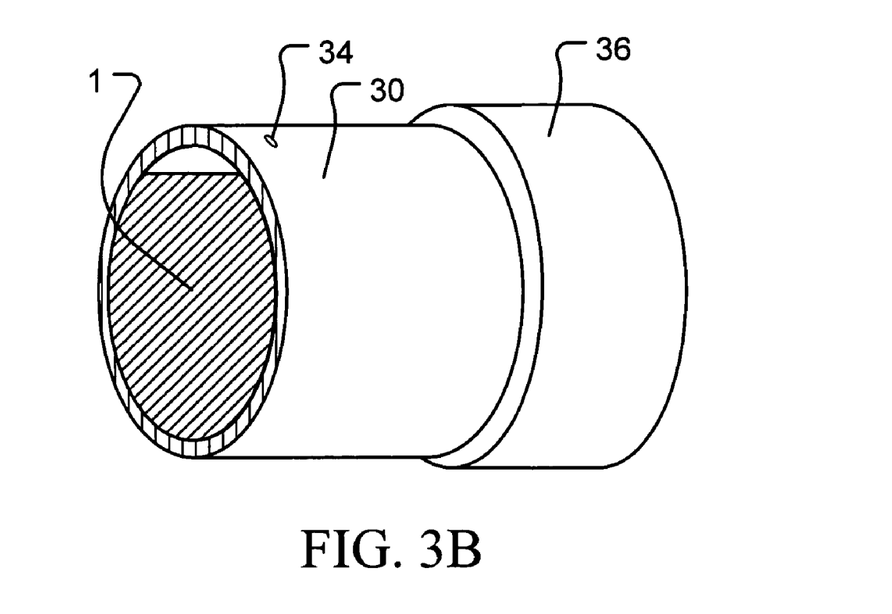

As illustrated in FIG. 3A, discs 1 and/or disc stacks 11 can be inserted into a tube 30 or other holder for thermal processing. Using the disc configuration illustrated in FIG. 1A with the flat region oriented toward the top, a channel or void space 36 is formed within the tube 30 as a longitudinal flow path for gas flow. An alignment structure 18 may be provided within the tube 30 to maintain the orientation of the discs 1 during subsequent processing and/or handling. A vent or port 34 may also be provided in the tube to allow for the escape of gases during the pre-bake and sintering thermal treatments within the vacuum chamber. The vent or port may also be configured for attachment to a vacuum line for removing gaseous radio-isotopes during irradiation of the final target assembly. As illustrated in FIG. 3B, the ends of the tube 30 may be sealed with a cap 36 or a metal foil (not shown). In those instances in which the tube 30 is sealed with a foil, the seal may be somewhat less complete than that provided by the cap 36 and the vent or port 34 may be omitted.

Figure 4A:
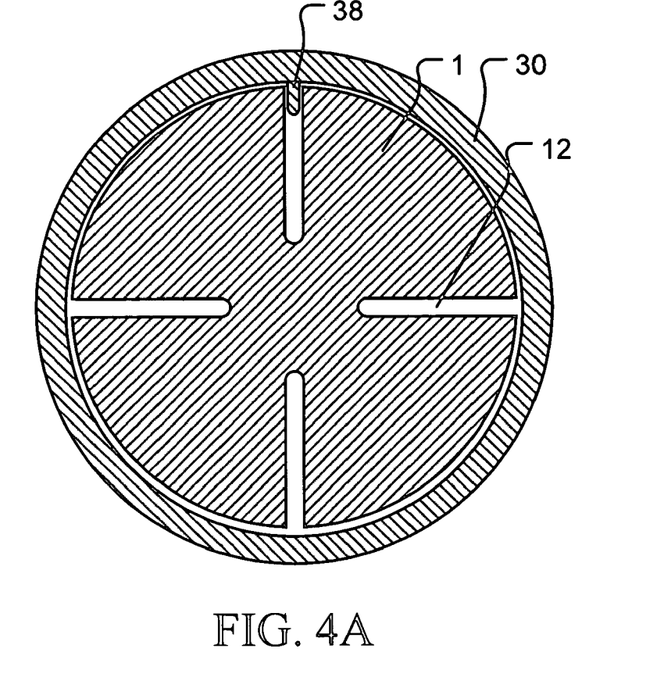
FIGS. 4A and 4B illustrate lateral and longitudinal cross-sectional views of targets according to the invention arranged in a holder.
Figure 4B:
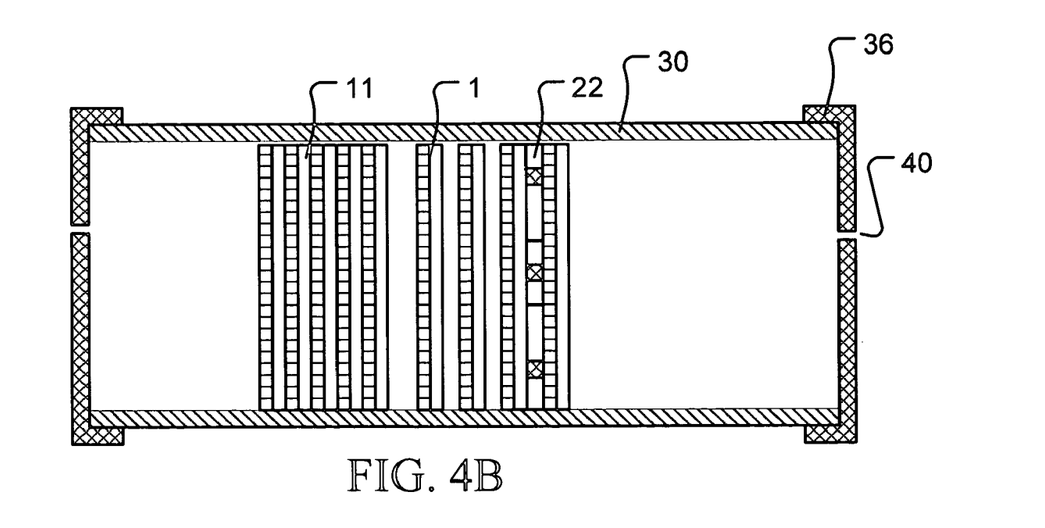

Another exemplary embodiment is illustrated in FIGS. 4A-B. As illustrated in FIG. 4A, a disc 1 generally corresponding to FIG. 1B is placed in a tube 30 having at least one alignment structure 38 that will cooperate with the peripheral portion of a slot 12 to maintain the orientation of the disc within the tube. As illustrated in FIG. 4B, the discs may be stacked in the tube 30 as a disc stack 11 or as individual discs 1 and may be in contact with adjacent discs, separated by a spacer element 22 or simply maintained in a spaced apart configuration as desired. In addition to or in place of the tube vent 34, one or both of the caps 36 can be provided with vent or port structures 40. If the tubes are appropriately configured, once the enclosed discs have been sintered, the tubes and the discs they contain can be used as a target for the production of radioisotope species.

As noted above, the discs, i.e., the green target elements, and the tube or holder in which the discs are arranged may then be placed in a vacuum chamber and heated, either directly using resistive, RF or microwave heating or indirectly using another heat source. The initial heating will typically utilize a temperature ramp rate sufficiently slow, e.g., 0.5 to 2° C./minute to reduce the thermal stress on the discs and to allow sufficient time for the outgassing and/or burn-off of the majority of the organic components and the diffusion of the resulting gases into the vacuum chamber. A slow heating rate also generally preferred to reduce the likelihood that the green layer will "burst" as the result of gases trapped or generated within the green layer. After reaching a temperature at which the majority of the organic components should have been removed from the green discs, typically by about 750 to about 900° C., the ramp rate may be increased to something on the order of about 2 to about 5° C./minute or more to bring the green discs to a an appropriate temperature within a sintering and/or densification range.

In general, both the initial temperature and the initial temperature ramp rate will be relatively low to maintain the rate at which the gases are released from the green casting layer at a level within the ability of the vacuum pump to remove the additional gas and maintain the desired degree of vacuum. If the outgassing rate exceeds the pump capacity, the pressure within the vacuum chamber will increase above the target pressure and compromise the ability to maintain a relatively oxygen-free atmosphere within the vacuum chamber.

The vacuum chamber may be maintained at a relatively low pressure, e.g., below about $10^{-5}$ torr, and preferably below about $10^{-6}$ torr, to maintain a relatively oxygen and nitrogen free atmosphere within the chamber during the thermal treatment of the cast layer. In principle, an inert gas atmosphere, e.g., He, Ar, Ne, or Kr, could be utilized at somewhat higher pressures. A vacuum atmosphere is, however, preferred because it will tend to be less expensive than the use of noble gases and that the reduced pressure assists in the "cracking," sublimation and outgassing of the binders, plasticizers and other organic components remaining in the green cast layer. Some of these organic materials may be relatively high molecular weight polymers that would be difficult to remove from the composition at higher pressures.

The target sintering temperature is typically determined by the vapor pressure of the materials present in the disc. The target sintering temperature should be selected to fall within a range between a temperature high enough to sinter/densify the material and a temperature at which material loss through sublimation becomes excessive. The target sintering temperature, therefore, is typically selected to obtain a vapor pressure of no more than about $10^{-6}$ torr for the materials utilized in the green disc under treatment. For SiC this temperature is between about 1650 and about 1700° C., for TiC this temperature is estimated to be between about 1800 and about 1900° C., and for ZrC this temperature is estimated to be between about 2000 and about 2200° C. However, because the maximum sintering temperature to which the graphite foil substrate may be exposed is on the order of 1900° C., in ZrC applications the graphite component rather than the cast layer composition determines the sintering temperature.

When the samples prepared according to example 3 were analyzed, it was determined that the relative average density of the sintered ZrC layer discs (excluding the graphite foil) was about 3.60 g/cm$^3$, a value which is 54.9% of the theoretical density (the accepted density for ZrC is 6.56 g/cm$^3$). It is known that ZrC is a difficult ceramic to process, at least in part because of the high temperatures required for sintering. It is known that pressurized sintering of ZrC may generally be performed at temperatures between 1900° C. and 2300° C., but even higher temperatures are required for standard sintering. Such ideal temperatures are not, however, easily attainable without exceeding the temperature limits of the surrounding material(s) and as a result, such temperatures are rarely utilized.

As noted above, the milling equipment may contribute an unacceptable level of contamination to the slurry composition and/or limit the duration of the milling process. For example, refractory carbides are well known for their hardness and their particles tend to form good abrasives. Milling a slurry of such particles in an alumina chamber and with the inclusion of alumina milling stones will gradually increase the level of aluminum contamination (from the alumina $Al_2O_3$) within the slurry. Matching the inner surface of the milling vessel and the grinding stones with the metal carbide being processed may reduce the level of contamination in the final slurry and/or allow for longer milling times. The longer milling times, in turn, may allow the final slurry to exhibit a generally lower average particle size distribution and/or improved rheological properties.

For example, a combination of a tungsten carbide (WC) vessel or milling jar in combination with tungsten carbide mill balls can provide improvements over the conventional alumina materials. In particular, because of its increased hardness and improved resistance to abrasion by the refractory powders used in the slurry compositions, using a tungsten carbide mill jar and tungsten carbide mill balls will tend to decrease the level of extraneous material added to the slurry during the milling process. Further, because tungsten carbide is itself a refractory carbide with low volatility at high temperatures, the tungsten carbide that is introduced into the slurry will not tend to produce unwanted vapors when the green castings are processed at the higher sintering temperatures.

In addition to the sintering difficulties associated with ZrC, the greater density of the ZrC relative to the SiC and TiC also makes it more challenging to maintain in suspension during the casting process and limits the amount of milling that can be completed without producing excess contamination from a dissimilar milling jar. One solution has been to rely more heavily on more volatile components within the slurry composition to increase the rate at which the slurry dries to the green layer, thereby substantially fixing the distribution of the ceramic particles within the cast layer. The more volatile components, however, bring their own set of limitations and concerns including increased flammability and reduced density. Overly rapid drying can also cause stresses within the cast layer that may increase the likelihood of cracking and/or delamination of portions of the cast layer.

It was found that preparing a slurry composition having between about 20 and about 22% solvent in the ZrC slurry mixture provided less satisfactory results. A combination of methylethylketone (MEK) and ethanol (Etol), at a 60:40 ratio also provided less successful than the TCE for maintain the solubility of the remaining organic components. Various composition adjustments were explored in an attempt to improve the suspension of the particles within the cast layer, but the MEK/Etol based slurries tended to exhibit a higher degree of non-uniformity across the surface of the cast layer than those prepared with TCE. This non-uniformity resulted in a somewhat grainy surface appearance on the dried cast layer.

The TiC discs prepared according to Example 2 above produced cast layers exhibiting a green density of approximately 2.5 g/cm$^3$ (about 51% of the theoretical density). The dried cast layer was not particularly even, a condition that was attributed to solubility factors with the surfactant used. In particular, the butanol which was added to the slurry composition in order to break down some of the bubbles was found not to be totally compatible with one or more of the other organic additives included in the composition.

In an effort to improve the performance of the TiC slurry composition, a variety of solvent mixtures containing both 1-butanol and methanol were tested as alternatives to the butanol. A solvent mixture having a butanol:methanol ratio of about 60/40 was found to provide the best results. The binder PVA has a high viscosity when dissolved in water and, when combined with the ceramic particles to form a slurry, tends to increase the number of trapped air bubbles within the slurry. Bubbles trapped in the green cast layer tend to lower the density and increase the likelihood of cracks within the layer. With the addition of the binary solvent mixture, the solubility problems were reduced along with the number of air bubbles to provide a slurry composition having increased density.

The relative densities of the SiC cast layer on discs prepared according to Example 1 were found to be higher than those of the TIC discs, a result that is attributed primarily to solubility factors associated with the particular combination of solvents used in forming the final slurry. In preparing both the SiC and TiC slurries, a combination of different mean particles size samples were utilized. In the case of the SiC slurry, the carbide particles included both 1 µm and 7 µm distribution samples while in the case of the TiC slurry, the carbide particles included both 2 µm and 10 µm particle distributions. With respect to the SiC cast layer, however, a green density of 2.1 g/cm$^3$ was observed (about 66% of the anticipated value). When only the 7 µm silicon carbide powder was used to form the slurry, the green density obtained was only about 1.75 g/cm³ (about 54% of the anticipated density). It is believed that the use of a combination of larger and smaller particulate samples (bimodal size distribution) increases the effective packing density of the particles as the smaller particles fill the interstitial spaces between adjacent larger particles. In order to increase the green density of a cast layer, therefore, broader range of particles sizes can be useful.

Milling is also important to ensure that there is a good particle suspension in the final slurry composition, especially between the organic components and the powder material. The better dried green cast layers were generally considered to be those having a smooth surface appearance which also tended to be associated with improved flexibility. The average cast thickness obtained from the sample discs prepared according to Examples 1-3 was about 0.25 mm, which, after sintering, produced a cast layer having a thickness of about 0.2 to about 0.25 mm.

Although each of the Examples provided above includes a single predominant ceramic compound, blends of compatible ceramic materials could be processed in a similar fashion (e.g., at least two different carbides selected from metal carbides and semiconductor carbides). In particular, blends of mixtures of more similar ceramic compounds such as carbides of different metals would tend to be compatible and could be incorporated easily into a single cast layer. Similarly, blends of various metal oxides and blends of various nitrides would also tend to be compatible and could, therefore, be processed in a similar fashion.

Blends of dissimilar materials, e.g., carbides and nitrides, may present some processing challenges, but selection of compatible materials and suitable substrate materials would provide combinations that would not suffer unacceptable levels of degradation at higher temperatures. For example, while mixtures of nitrides and carbides, i.e., SiC with AlN, would generally present no difficulty, but mixtures of carbides and oxides, nitrides and oxides or oxides on graphite substrates would tend to produce $CO$, $CO_2$, $NO$, and/or $NO_2$ and would tend to degrade the ceramic layer and/or the substrate. Similarly, more complex ceramic compounds including tertiary and quaternary compounds could be incorporated either singly or in combination with other more complex ceramics or with one or more of the binary carbide, nitride or oxide compounds.

In addition to the ceramic compound or compounds incorporated into the slurry composition, other materials may be added to improve the thermal conductivity and/or mechanical strength of the resulting composite target elements. The additional materials may be incorporated in the slurry or like, for example, a carbon felt or lattice could be impregnated with the slurry composition.

Although certain non-limiting examples of the invention have been described in detail above, it should be understood that many variations and/or modifications of the basic inventive concepts herein taught, which may appear to those skilled in the art, will still fall within the spirit and scope of the example embodiments of the invention as defined in the appended claims.

What is claimed is:

1. A method of fabricating an irradiation target, comprising:
    combining a finely divided metal carbide powder and a solvent to obtain an initial slurry;
    incorporating additional organic components into the initial slurry to produce a final slurry;
    depositing a layer of the final slurry on a substrate;
    evaporating a major fraction of the solvent to obtain a green cast article; and
    sintering the green cast article under conditions sufficient to remove substantially all remaining organic material and to sinter the metal carbide powder to obtain an irradiation target having a densified ceramic layer disposed on the substrate, wherein the substrate is a flexible graphitic carbon foil.

2. The method of fabricating an irradiation target according to claim 1, wherein sintering the green cast article includes:
    placing a plurality of green cast articles in a recess provided in a holder; and
    passing an electrical current through the holder, thereby heating the green cast articles to a temperature sufficient to remove substantially all remaining organic material from the final slurry.

3. The method of fabricating an irradiation target according to claim 2, wherein passing an electrical current through the holder includes:
    establishing an initial electrical current $I_0$; and
    increasing the electrical current at a rate of at least 0.1 A/minute to reach a final electrical current $I_f$ of no more than about 450 A.

4. The method of fabricating an irradiation target according to claim 2, wherein:
    the holder is configured for enclosing the plurality of green cast articles; and
    the green cast articles are configured to provide a longitudinal flow path within the holder.

5. The method of fabricating an irradiation target according to claim 4, wherein:
    the holder is fabricated from tantalum or alloys thereof; and
    the longitudinal flow path is formed along an inner sidewall of the holder.

6. The method of fabricating an irradiation target according to claim 1, wherein:
    the substrate has a first thickness $T_s$; and
    the densified ceramic layer has a second thickness $T_c$, wherein a ratio between $T_s$ and $T_c$ is between about 2:1 to 1:2.

7. The method of fabricating an irradiation target according to claim 5, wherein:
    the substrate has a first thickness $T_s$; and
    the densified ceramic layer has a second thickness $T_c$, wherein a ratio between $T_s$ and $T_c$ is between about 2:1 to 1:2.

8. The method of fabricating an irradiation target according to claim 1, wherein:
    the carbide powder is SiC;
    the solvent is a butanol:methanol mixture having a ratio between about 2:1 and 1:2; and
    the additional organic component includes PVA as a binder.

9. The method of fabricating an irradiation target according to claim 1, wherein:
    the carbide powder has a bimodal size distribution;
    the solvent includes trichloroethylene; and
    the additional organic component includes a combination of PEG 400 and BBP as plasticizers comprising less than about 5 wt % of the final slurry.

10. The method of fabricating an irradiation target according to claim 1, wherein:
    the carbide powder has a bimodal size distribution wherein a ratio between a lower peak particle size and an upper peak particle size is less than 1:2.

11. The method of fabricating an irradiation target according to claim 1, wherein:
the carbide powder has a bimodal size distribution wherein a ratio between a lower peak particle size and an upper peak particle size is less than 1:5.

12. The method of fabricating an irradiation target according to claim 1, wherein:
the carbide powder has a bimodal size distribution and includes at least two different carbides selected from metal carbides and semiconductor carbides.

13. The method of fabricating an irradiation target according to claim 1, wherein:
a ratio between a lower peak particle size and an upper peak particle size is less than 1:2;
the solvent is selected from a group consisting of butanol: methanol mixtures having a ratio between about 2:1 and 1:2, and trichloroethylene and mixtures thereof; and
the additional organic component includes a binder selected from a group consisting of PVA, PVB and mixtures thereof.

14. A method of fabricating an irradiation target, comprising:
combining a finely divided ceramic material and a dispersant to obtain an initial slurry;
incorporating additional organic components into the initial slurry to produce a final slurry;
depositing a layer of the final slurry on a substrate;
evaporating a major fraction of the dispersant to obtain a green cast article; and
sintering the green cast article under conditions sufficient to remove substantially all remaining organic material and to sinter the ceramic material to obtain an irradiation target having a densified ceramic material layer disposed on the substrate, wherein the substrate is a flexible graphitic carbon foil.

15. The method of fabricating an irradiation target according to claim 14, wherein sintering the green cast article includes:
placing a plurality of green cast articles in a recess provided in a holder; and
passing an electrical current through the holder, thereby heating the green cast articles to a temperature sufficient to remove substantially all remaining organic material from the final slurry.

16. The method of fabricating an irradiation target according to claim 14, wherein sintering the green cast article includes:
placing the green cast article under an atmosphere selected from a group selected from a substantially inert atmosphere and an oxidizing atmosphere.

17. The method of fabricating an irradiation target according to claim 15, wherein:
the atmosphere is maintained at a pressure below atmospheric pressure.

18. The method of fabricating an irradiation target according to claim 16, wherein:
the substantially inert atmosphere is maintained by introducing a gas selected from a group consisting of $N_2$, Ar, Ne, Kr and mixtures thereof.

19. The method of fabricating an irradiation target according to claim 14, wherein:
the ceramic material is selected from a group consisting of oxides, nitrides, carbides, oxynitrides and mixtures thereof.

* * * * *